US009277505B2

(12) United States Patent
Kim et al.

(10) Patent No.: US 9,277,505 B2
(45) Date of Patent: Mar. 1, 2016

(54) METHODS FOR POWER CONTROL AND LINK ADAPATION IN LTE-BASED MOBILE COMMUNICATION SYSTEM

(71) Applicant: Electronics and Telecommunications Research Institute, Daejeon (KR)

(72) Inventors: Hee Wook Kim, Daejeon (KR); Kun Seok Kang, Daejeon (KR); Bon Jun Ku, Daejeon (KR); Do Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/399,926

(22) PCT Filed: Dec. 27, 2012

(86) PCT No.: PCT/KR2012/011595
§ 371 (c)(1),
(2) Date: Nov. 7, 2014

(87) PCT Pub. No.: WO2013/168880
PCT Pub. Date: Nov. 14, 2013

(65) Prior Publication Data
US 2015/0126239 A1    May 7, 2015

(30) Foreign Application Priority Data

May 8, 2012   (KR) .................. 10-2012-0048412
Nov. 5, 2012  (KR) .................. 10-2012-0124225

(51) Int. Cl.
*H04B 7/00*     (2006.01)
*H04W 52/14*   (2009.01)
*H04W 52/32*   (2009.01)

(52) U.S. Cl.
CPC .......... *H04W 52/146* (2013.01); *H04W 52/143* (2013.01); *H04W 52/325* (2013.01)

(58) Field of Classification Search
USPC .............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS 6,542,745 B1 *   4/2003   Mottier ................... G01S 11/10
                                                                    455/422.1
8,195,112 B1 *   6/2012   Zhang ................. H04W 52/225
                                                                    455/127.2

(Continued)

FOREIGN PATENT DOCUMENTS

KR    10-2004-0047907 A    6/2004
KR    10-2006-0015192 A    2/2006

(Continued)

OTHER PUBLICATIONS

International Search Report for PCT/KR2012/011595 filed on Dec. 27, 2012.

*Primary Examiner* — Dominic E Rego (57) ABSTRACT

Provided is a power control and link adaptation method for compensating for a long round trip delay time and slow channel fading in a long term evolution (LTE)-based mobile communication system having a long round trip delay time, similar to a satellite mobile system, the method that may compensate for the long round trip delay time of the satellite mobile system in which a distance between a base station and a terminal is relatively long, when compared to a terrestrial LTE system, support a modulation and coding scheme (MCS) level requested by a terminal, by predicting a channel after the round trip delay time elapses, maintain compatibility within an existing LTE frame, by generating a transmit power control (TPC) instruction for an uplink closed-loop power control, on a frame by frame basis, and compensate for slow channel fading of the satellite mobile system.

11 Claims, 4 Drawing Sheets

(56) References Cited

U.S. PATENT DOCUMENTS

| | | | |
|---|---|---|---|
| 8,340,580 B1* | 12/2012 | Epstein | H04B 1/1027 455/114.2 |
| 2001/0028637 A1* | 10/2001 | Abeta | H04L 5/026 370/335 |
| 2006/0178120 A1* | 8/2006 | Puma | H03F 1/3241 455/114.3 |
| 2007/0026795 A1 | 2/2007 | De La Chapelle | |
| 2007/0242766 A1* | 10/2007 | Xu | H04L 1/0002 375/260 |
| 2008/0102873 A1* | 5/2008 | Kumar | H04W 52/24 455/522 |
| 2009/0290601 A1 | 11/2009 | Wang et al. | |
| 2010/0080178 A1* | 4/2010 | Cox | H04W 72/048 370/329 |
| 2010/0182951 A1* | 7/2010 | Park | H04L 1/0003 370/328 |
| 2010/0238885 A1* | 9/2010 | Borran | H04B 17/0077 370/329 |
| 2010/0296591 A1* | 11/2010 | Xu | H04B 7/0613 375/259 |
| 2011/0098073 A1* | 4/2011 | Park | H04W 56/0035 455/509 |
| 2011/0217985 A1* | 9/2011 | Gorokhov | H04W 24/10 455/452.2 |
| 2012/0087337 A1* | 4/2012 | Yang | H04W 52/146 370/331 |
| 2014/0233710 A1* | 8/2014 | Tu | H04B 3/487 379/32.04 |

FOREIGN PATENT DOCUMENTS

| | | |
|---|---|---|
| KR | 10-2010-0071687 A | 6/2010 |
| KR | 10-2010-0084955 A | 7/2010 |
| KR | 10-2011-0022526 A | 3/2011 |

* cited by examiner

METHODS FOR POWER CONTROL AND LINK ADAPATION IN LTE-BASED MOBILE COMMUNICATION SYSTEM

TECHNICAL FIELD

The present invention relates to a power control and link adaptation method for compensating for a long round trip delay time and slow channel fading in a long term evolution (LTE)-based mobile communication system having a long round trip delay time, similar to a satellite mobile system.

The present invention is a result of research conducted by a broadcasting communication infrastructure original technology development project of the Korea Communication Commission. [KCA-2012-12-911-01-201, Development in optimum technology for utilizing 2.1 GHz satellite frequency band for terrestrial mobile communication]

BACKGROUND ART

The present invention relates to a power control and link adaptation method for compensating for a long round trip delay time and slow channel fading in a long term evolution (LTE)-based mobile communication system having a long round trip delay time and a peak to average power ratio (PAPR) sensitive characteristic, similar to a satellite mobile system.

In the future, a mobile communication network is expected to evolve towards a combination of or cooperation between a terrestrial network and a satellite network. In an integrated satellite and terrestrial system, a commonality between a satellite and a terrestrial wireless interface is an important factor to be considered in terms of a cost for a terminal. In particular, in view of an LTE-based terrestrial mobile system being considered a next generation international mobile telecommunication (IMT)-advanced system, there is a great demand for research on an LTE-based satellite wireless interface which has an even larger cell radius and longer round trip delay time, when compared to a terrestrial network, and is in consideration of a power limited satellite network environment.

A power control is essential to transmit required power for supporting a specific data rate in a mobile communication system, for example, a current cellular communication system. An overly great amount of power may cause unnecessary interference. An extremely small amount of power may increase data transmission errors and a demand for retransmission, and consequently cause a longer transmission delay and a lower processing rate. In a case of a wideband code division multiple access (WCDMA)-based mobile communication system, a power control may be an important factor to be considered in resolving a near-far problem, in particular, in an uplink. In the case of the WCDMA-based mobile communication system, an uplink transmission may not have orthogonality. Accordingly, unless the power control is performed precisely, a strong signal level of user equipment (UE) in a cell center region may cause interference in a weak signal of UE in a cell boundary region. In addition, a power control may be considered for a WCDMA downlink in order to maintain a fixed data rate and delay time, in a similar manner. However, in a case of high speed data transmission, for example, high speed packet access (HSPA), a link adaptation by which a terminal transmits full power and adjusts a data rate based on a channel state may be used in general, rather than the power control.

The link adaptation may refer to a technology for adjusting and adapting a transmission parameter based on a change in a wireless channel state, and may be employed to increase a transfer rate, system capacity, and frequency efficiency. Representative technologies for implementing a link adaptation may include a power control, a hybrid automatic repeat request (H-ARQ), and an adaptive modulation and coding (AMC).

A power control directly related to the present invention is employed solely for a link adaptation in a second generation CDMA scheme, and corresponds to a technology for assuring an overall uniform quality by assigning a much higher transmit power to a terminal distant from a base station than a terminal close to the base station. A power control in the CDMA scheme may be associated with an issue of maximizing a capacity of the base station. In particular, when a transmit power of a wireless terminal positioned at a cell boundary is increased in order for the base station to allow a higher transmit power to a distance wireless terminal than a close wireless terminal for quality assurance, interference in an adjacent cell may be caused. Minimal control of the transmit power minimally may be referred to as the power control.

The power control may be divided into an uplink power control and a downlink power control, and the uplink power control may be classified into an open-loop power control and a closed-loop power control.

The uplink power control may refer to a control of a transmit power of a mobile station, and a technology for enabling all mobile stations to maintain fine communication quality and maximize capacities. A transmit power of a mobile terminal may be controlled in order to produce a minimum signal-to-noise ratio, by equalizing power received by a base station from each mobile terminal.

The downlink power control may refer to a control of a transmit power of a base station, for example, a reduction of interference between mobile communication cells, and correspond to a scheme of outputting a relatively large amount of transmit power to a mobile station distant from the base station and outputting a relatively small amount of transmit power to a mobile station close to the base station.

The open-loop power control may refer to a technology for controlling a transmit power mainly by means of a mobile terminal without forming a loop between the mobile terminal and a base station, and correspond to a scheme of performing a power control on the assumption that a forward path loss is equal to a backward path loss.

The closed-loop power control may refer to a technology for correcting power control errors occurring in the open-loop power control. In the closed-loop power control, a base station may determine a power control bit by comparing a received $E_b/N_o$ and a requested $E_b/N_o$ at predetermined intervals, and provide instructions to a mobile station.

In a case of an uplink of the LTE-based terrestrial mobile system, a single carrier frequency division multiple access (SCFDMA) having orthogonality may be used and thus, a near-far problem may not occur, in contrast to the WCDMA-based mobile communication system. However, a high level of interference from an adjacent cell may still restrict an uplink coverage unless a power control is performed on UE of the adjacent cell. In particular, when a level of the interference from the adjacent cell increases, an interference of thermal (IoT) limiting a coverage of a target cell may increase. Accordingly, although the uplink power control may maintain the orthogonality in a cell, paying consideration to the interference from the adjacent cell may be advantageous. However, since the interference may be absent in the cell, an outstanding power control corresponding to the power control performed by the WCDMA-based mobile communication system may be unnecessary. In a case of a downlink of the LTE-based terrestrial mobile system, a link adaptation technology for supporting a maximum data rate based on a channel state at a maximum power, through a link adaptation corresponding to a channel state, rather than a power control, may be employed for high speed transmission.

As described above, the LTE-based terrestrial mobile system may be subject to the no near-far problem since little interference is present in a cell, when compared to the WCDMA-based terrestrial mobile system. In addition, since the link adaptation technology for high speed transmission is regarded to be a main technology, only a power control for resolving interference between cells may be an important consideration.

However, in a case of a mobile system having a long round trip delay time, similar to a satellite mobile system, when a signal transmission through a precise power control at a considered modulation and coding scheme (MCS) level is not performed, a service delay time may increase rapidly due to a relatively long round trip delay time for retransmission. Accordingly, reduction of a number of times the retransmission is performed through the precise power control may be important. In addition, by resolving a decreasing accuracy of a power control instruction for a closed-loop power control, resulting from the long round trip delay time when the power control is performed, the closed-loop power control may be performed precisely. In general, a compensation for the long round trip delay time considered for the uplink power control may not be reflected in a downlink power control not performing the power control. Accordingly, in order to compensate for a long round trip delay time, determination of an MCS level corresponding to a channel state based on the long round trip delay time may be necessary.

DISCLOSURE OF INVENTION

Technical Goals

An aspect of the present invention provides a technology for preventing a rapid increase in a round trip delay time by transmitting signals through a precise power control, in a satellite mobile system having the long round grip delay time.

Another aspect of the present invention provides a technology for reducing a number of times performing retransmission and increasing an accuracy of a power control instruction when a signal transmission through a precise power control fails, in a case in which a terrestrial long term evolution (LTE) system is applied.

Still another aspect of the present invention provides a system for providing a precise closed-loop power control when an accuracy of a power control instruction decreases, and compensating for a long round trip delay time for a case of a downlink not performing a power control.

Yet another aspect of the present invention provides a technology for effectively compensating for a slow channel fading of a satellite mobile system, and preventing an unnecessary change in power of a transmission terminal by applying a terrestrial long term evolution (LTE) system.

In addition, further another aspect of the present invention provides a transmit power control value of a terminal satisfying a signal to interference and noise ratio (SINR) for supporting a modulation and coding scheme (MCS) level requested by the terminal when a channel state is changed.

In particular, the aspects of the present invention provide a power control and link adaptation method of compensating for a long round trip time and slow channel fading in an LTE-based mobile communication system having the long round trip delay time, similar to a satellite mobile system.

Technical Solutions

According to an aspect of the present invention, there is provided a power control method for uplink data channel transmission in a satellite mobile communication system, the method including (a) determining a channel estimation value using a power spectral density (PSD) value of a frame unit, by a base station, and (b) generating a transmit power control (TPC) instruction based on the channel estimation value and a round trip delay time, and transmitting the generated TPC instruction to a terminal, by the base station. Here, a transmit power control value at the terminal may be determined based on the TPC instruction transmitted to the terminal and a delay compensation indicator.

The satellite mobile communication system may be configured based on a long term evolution (LTE) network, the data channel may correspond to a physical uplink shared channel (PUSCH), and the transmit power control value may be measured using the TPC instruction.

The PSD value of the frame unit may correspond to an average value of PSD estimation values in a sub-frame for a PUSCH transmitted in a frame.

The TPC instruction may be determined by reflecting a difference predicted value corresponding to a difference between a received PSD value and a target PSD value after the round trip delay time determined by the following Equation elapses, $$\Delta\epsilon,c(i)=\Delta\epsilon(i)+kG_1(PSD_{SRS}(i)-PSD_{SRS}(i-1)),\qquad \text{Equation:}$$

wherein $\Delta\epsilon,c(i)$ denotes a difference predicted value corresponding to a difference between a received PSD value and a target PSD value after the round trip delay time elapses, $\Delta\epsilon(i)$ denotes a difference between an estimated $PSD_{est}(i)$ and a $PSD_{target}$ for supporting a given modulation and coding scheme (MCS) level, a parameter k has a value of k=1 when channel prediction through a Sounding Reference Signal (SRS) is possible, or a value of k=0 when the SRS is unavailable, $G_1$ denotes a prediction gain indicator indicating a channel change predicted value to be reflected in $\Delta\epsilon(i)$, and has a value of $0 \le G_1 \le 1$, and $PSD_{SRS}$ denotes a received PSD of an SRS signal.

The transmit power control value may be determined by the following Equation, $$\delta(i)=\Delta_p(i)-\alpha\Delta_p(i-1),\qquad \text{Equation:}$$

wherein $\delta(i)$ denotes a transmit power control value, $\alpha$ denotes a delay compensation indicator, and has a value of $0 \le G_1 \le 1$, p(i) denotes a current TPC instruction, and p(i−1) denotes a past TPC instruction.

According to an aspect of the present invention, there is provided a downlink power control method in a satellite mobile communication system, the method including estimating a channel state of a target band on a frame basis, by a terminal, determining a channel change predicted value based on a round trip delay time, by the terminal, determining a final channel state estimated value, using a channel change predicted value after the round trip delay time elapses, by the terminal, determining an MCS level, by comparing the final channel estimated value to a PSD value required at each MSC level or a signal to interference and noise ratio (SINR) value, by the terminal, and transmitting channel quality indicator (CQI) information including the MCS level to a base station, by the terminal.

The target band may correspond to a sub-band, a plurality of sub-bands, or a full band, based on a reference signal (RS) for channel state information (CIS) to be transmitted to a downlink.

When a channel state of the target band is to be estimated on a frame by frame basis, the estimating may include estimating the channel state by estimating an SINR value or a PSD value of an RS in the target band.

The channel change predicted value may be determined by the following Equation, $$\Delta_{pred}=G_2(PSD_{CSI-RS}(i)-PSD_{CSI-RS}(i-1)),\qquad\text{Equation:}$$

wherein $G_2$ denotes a prediction gain indicator indicating a channel change predicted value to be reflected in $PSD_{est}$, and has a value of $0 \leq G_2 \leq 1$, and $PSD_{CSI-RS}(i)$ denotes a PSD value of an RS for CSI in an estimated $i^{th}$ frame.

The final channel state estimated value may be determined by the following Equation, $$PSD_{est}=PSD_{CSI-RS}(i)+\Delta_{pred}=PSD_{CSI-RS}(i)+\\G_2(PSD_{CSI-RS}(i)-PSD_{CSI-RS}(i-1)).\qquad\text{Equation:}$$

The final channel state estimated value may be determined by the following Equation determined using a physical broadcast channel (PBCH) and a synchronization channel (SCH), $$PSD_{est}=PSD_{CSI-RS}(i)+\Delta_{pred}=PSD_{CSI-RS}(i)+\\G_2(PSD_{CSI-RS+PBCH+SCH}(i)-\\PSD_{CSI-RS+PBCH+SCH}(i-1))\qquad\text{Equation:}$$

wherein $PSD_{CSI-RS+PBCH+SCH}(i)$ denotes a value obtained by reflecting a PSD of the PBCH and a PSD of the SCH in a PSD value of an RS for CSI in an estimated $i^{th}$ frame.

Detailed description of other embodiments will be provided in the detailed description and illustrated in the accompanying drawings.

Advantageous Effects

1. It is possible to compensate for a long round trip delay time of a satellite mobile system in which a distance between a base station and a terminal is relatively long, when compared to a terrestrial long term evolution (LTE) system.

2. It is possible to support a modulation and coding scheme (MCS) level requested by a terminal, by predicting a channel after a round trip delay time elapses.

3. It is possible to maintain compatibility within an existing LTE frame, by generating a transmit power control (TPC) instruction for an uplink closed-loop power control, on a frame by frame basis.

4. It is possible to compensate for a slow channel fading of a satellite mobile system in which a distance between a base station and a terminal is relatively long, when compared to a terrestrial LTE system.

5. A power control and link adaptation method according to an aspect of the present invention may have a compatibility with a conventional terrestrial LTE mobile communication system.

BEST MODE FOR CARRYING OUT THE INVENTION

Figure 1:
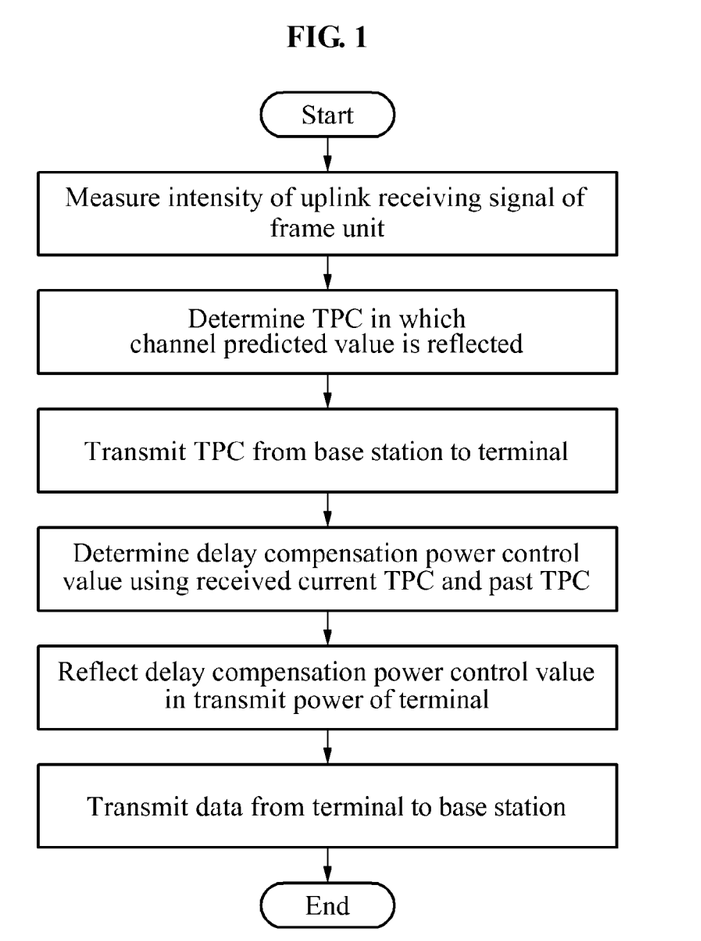
FIG. 1 is a flowchart illustrating a power control for an uplink physical uplink shared channel (PUSCH) transmission in a long term evolution (LTE)-based satellite mobile communication system having a long round trip delay time as suggested above.

FIG. 1 is a flowchart illustrating a power control for an uplink physical uplink shared channel (PUSCH) transmission in a long term evolution (LTE)-based satellite mobile communication system having a long round trip delay time as suggested above.

Figure 2:
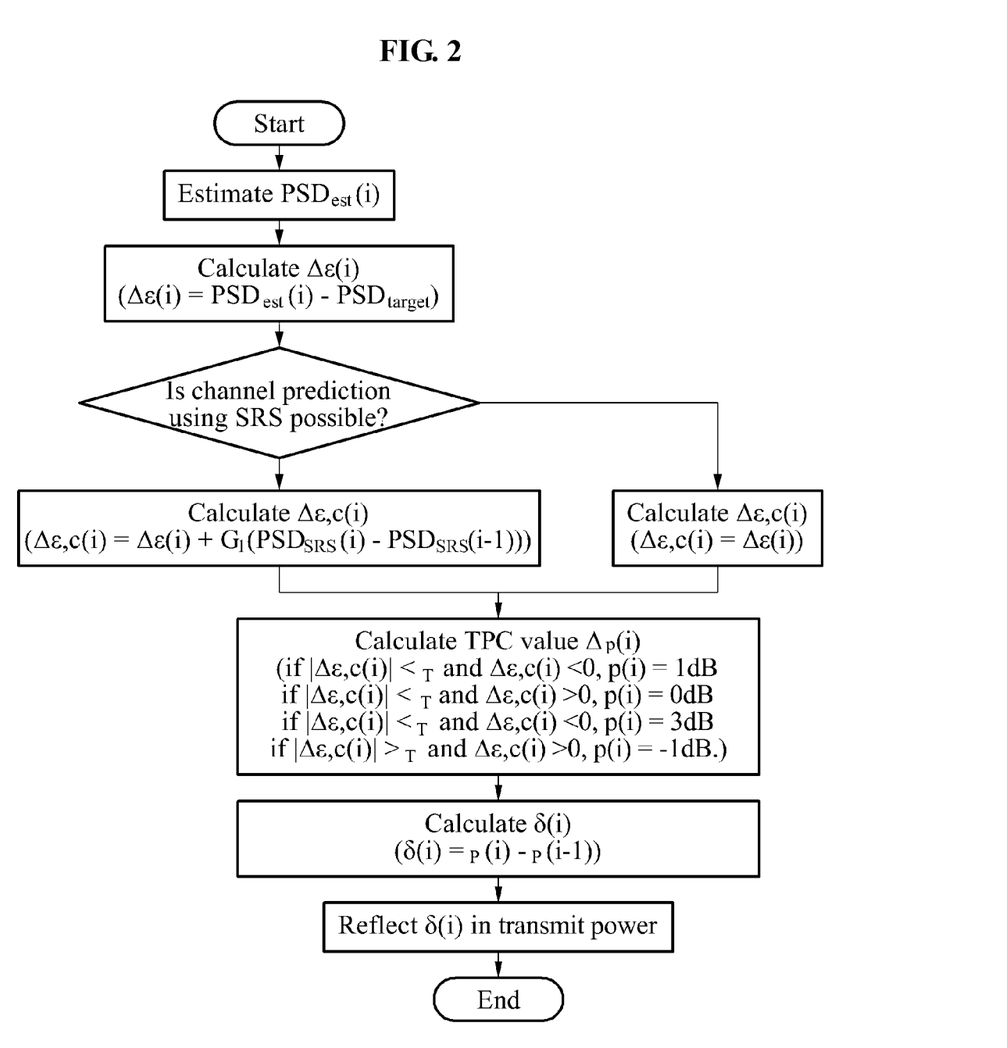
FIG. 2 is a detailed flowchart illustrating a power control for an uplink PUSCH transmission in an LTE-based satellite mobile communication system having a long round trip delay time as suggested above.

FIG. 2 is a detailed flowchart illustrating a power control for an uplink PUSCH transmission in an LTE-based satellite mobile communication system having a long round trip delay time as suggested above.

Figure 3:
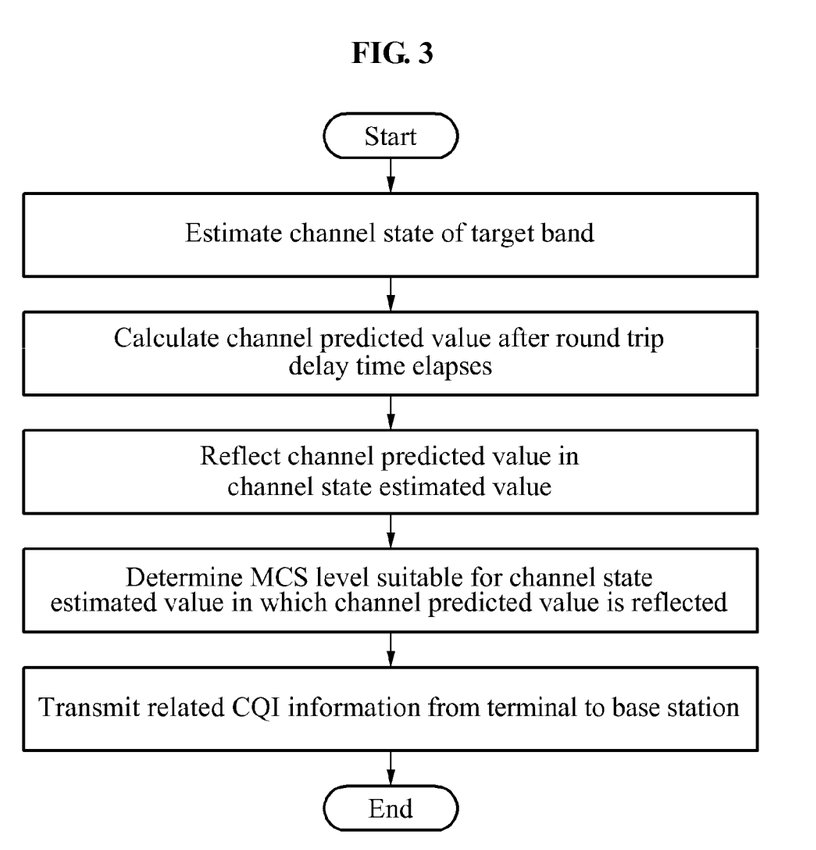
FIG. 3 is a flowchart illustrating a downlink link adaptation considering a long round trip delay time as suggested.

FIG. 3 is a flowchart illustrating a downlink link adaptation considering a long round trip delay time as suggested.

Figure 4:
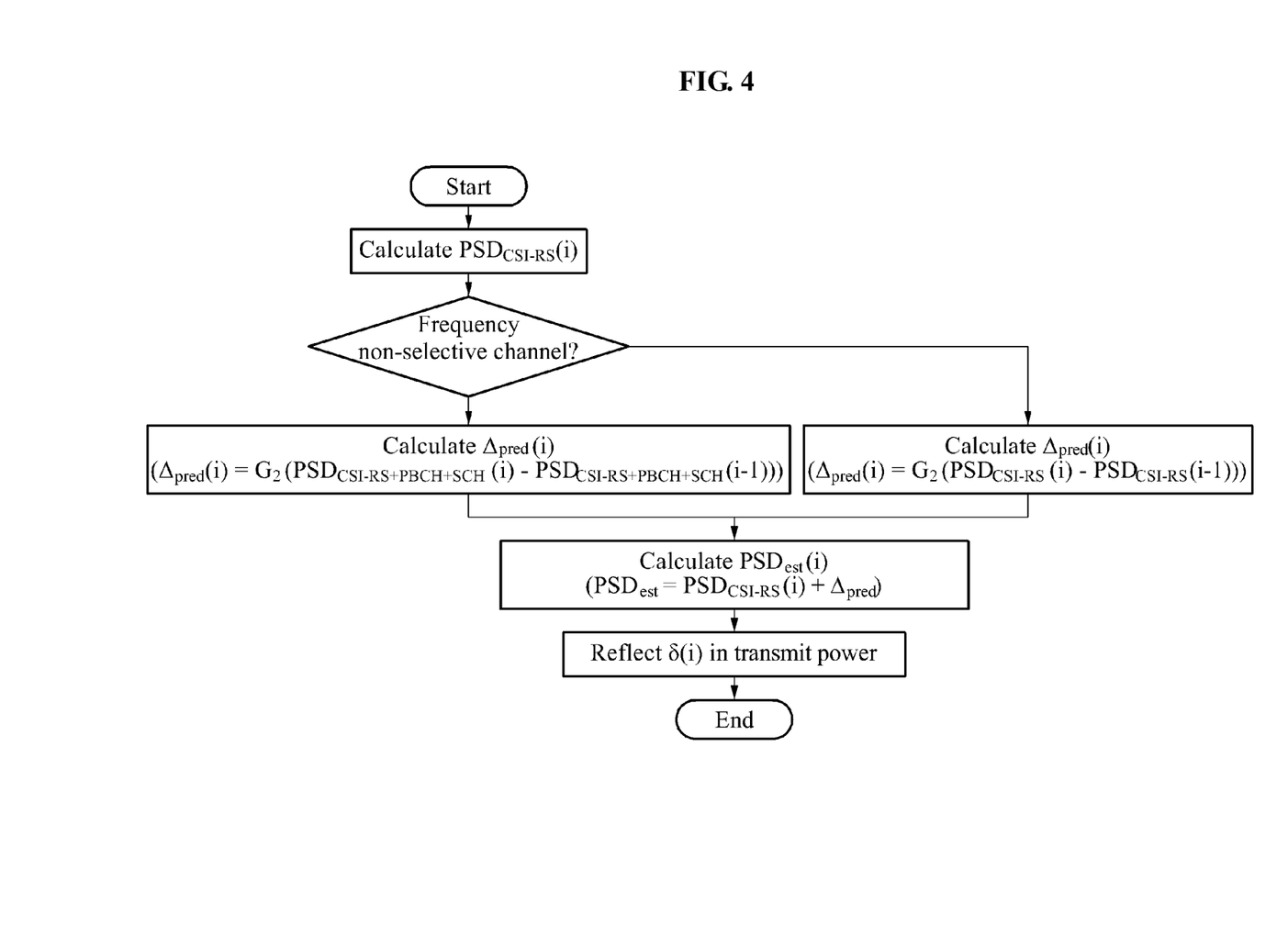
FIG. 4 is a detailed flowchart illustrating a downlink link adaptation method considering a long round trip delay time as suggested.

FIG. 4 is a detailed flowchart illustrating a downlink link adaptation method considering a long round trip delay time as suggested. Reference will now be made in detail to embodiments of the present invention, examples of which are illustrated in FIGS. 1 through 4.

The embodiments will be described with respect to an LTE-based satellite mobile communication system. However, the method of the present invention may be applied to any other mobile communication systems having a long round trip delay time.

Generally, in an LTE-based mobile system, a power control of a PUSCH transmission corresponding to an uplink data channel may be expressed as Equation 1.

$$P_T(i)=\min\{P_{MAX},P_0(i)+\alpha PL_{DL}+10\log 10(M(i))+\\\Delta_{MCS}(i)+\delta(i)\}\qquad\text{[Equation 1]}$$

In Equation 1, $P_0(i)$ denotes a cell-specific parameter to be broadcast as a portion of system information, and corresponds to a desired reception power level in an $i^{th}$ sub-frame. $M(i)$ denotes an instantaneous PUSCH bandwidth calculated based on a number of resource blocks in the $i^{th}$ sub-frame. $\Delta_{MCS}(i)$ denotes a relative signal to interference and noise ratio (SINR) value for supporting a modulation and coding scheme (MCS) considered for a PUSCH transmission in the $i^{th}$ sub-frame, reflects that different SINR values may be requested based on different modulation schemes and coding rates used for the PUSCH transmission in each sub-frame. $M(i)$ denotes a value indicating a number of resource blocks to be assigned for the PUSCH transmission in the $i^{th}$ sub-frame, and simply reflects that basic control of a power per resource block may be enabled. Accordingly, assigning a larger number of resource blocks may correspond to a greater amount of reception power, and indicate that a greater amount of transmit power may be required. In the case of the PUSCH transmission, an explicit power control instruction for controlling $\delta(i)$ may not be included in a downlink scheduling assignment, but included in an uplink scheduling approval. In addition, with respect to a PUSCH power control instruction, an explicit power control instruction may be provided via a special physical downlink control channel (PDCCH) providing power control instructions to multiple terminals, simultaneously, and the explicit power control instruction may correspond to a multilevel instruction. When a path attenuation is completely compensated for, $\alpha=1$ may be satisfied, and a value satisfying $\alpha<1$ may also be supported based on an asymmetry between an uplink and a downlink. In addition to compensating for the path attenuation, unless a transmit power of a terminal exceeds a maximum transmit power limit, a network may select a power control scheme including the MCS and the $\Delta_{MCS}(i)$, and guarantee that a reception SINR corresponds to an SINR requested by a corresponding MCS.

A transmit power control (TPC) instruction corresponds to a transmit power control, and refers to a power control technique suggested in 802.11h for determining an amount of transmit power properly to minimize an interference with another node in a 5 gigahertz (GHz) band.

$\delta(i)$ denotes a value indicating a change in a current PUSCH power control, the change made to a past PUSCH in response to the TPC instruction with respect to the $i^{th}$ sub-frame. $\delta(i)$ may be defined as Equation 2.

$$\delta(i)=\delta(i-1)+\Delta_p(i-4) \quad \text{[Equation 2]}$$

In Equation 2, $\Delta_p(i-4)$ indicates that a time delay between a time at which a TPC instruction is received and a time at which an uplink power is controlled based on the received TPC instruction corresponds to a time length corresponding to 4 sub-frames. In particular, a change in power in a current $i^{th}$ sub-frame may be defined by a TPC instruction transmitted from an $i-4^{th}$ sub-frame via a PDCCH. A value of $\Delta_p(i)$ may correspond to a value of [−1, 1] or [−1 0 1 3] depending on a PDCCH format, through a comparison to a threshold value defined by a system, as shown in Equation 2.

An uplink data channel power control method of the LTE-based terrestrial mobile system described above may have several issues, in a case of a mobile system having a long round trip delay time. First, a frequent power control performed on a sub-carrier wave basis may be ineffective in a satellite mobile system capable of compensating for a rapid channel change, due to a long round trip delay time, and the frequent power control may cause an unnecessary change of a power of a transmission terminal. In addition, due to the long round delay time, a TPC instruction transmitted from a base station side to a terminal based on an uplink channel state may fail to satisfy an SINR for supporting an MCS requested by the terminal since the uplink channel state at a time when the terminal initiated the transmission is likely to be changed. Accordingly, in the LTE-based satellite mobile communication system having the long round trip delay time, there is a need for a power control technique for supporting an MCS level requested by a terminal, by compensating for the long round trip delay time and predicting a channel after the round trip delay time elapses.

To this end, in the LTE-based satellite mobile communication system, a base station may generate a TPC instruction for an uplink closed-loop power control, on a frame by frame basis, rather than a sub-frame by sub-frame basis. Accordingly, by transmitting the TPC instruction for a PUSCH power control for each frame, an unnecessary transmission of the TPC information may be prevented. In addition, the power control method performed on a frame by frame basis, the TPC instruction may be transmitted while a compatibility within an existing LTE frame is maintained by a base station scheduler.

Accordingly, in an LTE-based mobile system having a long round trip delay time, in generally, a power control of a PUSCH transmission corresponding to an uplink data channel may be expressed by Equation 3.

$$P_T(i)=\min\{P_{MAX}, P_0(i)+\alpha PL_{DL}+10\log 10(M(i))+\Delta_{MCS}(i)+\delta(i)\} \quad \text{[Equation 3]}$$

In Equation 3, i denotes a frame number, as opposed to a sub-frame number. In particular, in the suggested power control method, a power control instruction for a specific PUSCH may be transmitted once at most for each frame, and a reduced resource for physical uplink control channel (PUCCH) for TPC instruction may be used for a downlink physical downlink shared channel (PDSCH) and thus, a downlink data transmission capacity may be increased. Conversely, a power control scheme suggested with respect to the LTE-based mobile satellite communication system may be performed on a frame by frame basis and thus, a number of resource blocks to be transmitted and an MCS level for a PUSCH transmission may be applied on a frame by frame basis. An operation of a sub-frame in the LTE-based terrestrial mobile communication system may have advantages of a reduction of a service delay time, an adaptation to a rapid channel change, and the like due to a reduction of a retransmission time delay. In the case of the satellite mobile communication system, little difference in a service delay time between a retransmission performed on a sub-frame basis and a retransmission performed on a frame by frame basis may be present, and the adaptation to the rapid channel change may be difficult, due to a long round trip delay time. Accordingly, when considering that a link adaptation technology, for example, an adaptive modulation and demodulation in the LTE-based satellite mobile communication system, performed on a frame by frame basis may be necessary, a power control performed on a frame by frame basis may be applicable to the LTE-based satellite communication system, readily.

In Equation 3, $P_0(i)$, $\alpha PL_{DL}$, $M(i)$, and $\Delta_{MCS}(i)$ may be operated on a frame by frame basis, but may be determined by a manner identical to a method performed in the conventional LTE-based mobile communication system. However, $\delta(i)$ to be transmitted from a base station for a closed-loop power control may consider a long round trip delay time and be accompanied with delay compensation and channel prediction, in contrast to the conventional LTE-based mobile communication system. In the suggested method, in order to generate a TPC instruction, a base station may estimate a power spectral density (PSD) corresponding to a reception power per sub-carrier wave of a PUSCH received in an $i^{th}$ frame. The PSD estimation may be performed based on an average value of PSD estimated values at all sub-frames for a PUSCH transmitted in the $i^{th}$ frame. The PSD estimation for precise channel estimation may be replaced with SINR estimation, in consideration of interference. The SINR estimation may be performed for reducing an effect of a rapid channel change impossible to be compensated for due to a long round trip delay time and compensating for a slow channel characteristic. When $\Delta\epsilon(i)$ denotes a difference between estimated $PSD_{est}(i)$ and $PSD_{target}$ corresponding to a target PSD for supporting a given MCS level, as expressed by Equation 4, $$\Delta\epsilon(i)=PSD_{est}(i)-PSD_{target} \quad \text{[Equation 4]}$$

A difference predicted value $\Delta\epsilon,c(i)$ corresponding to a difference between a received PSD and the target PSD after a round trip delay time elapses may be expressed by Equation 5.

$$\Delta\epsilon,c(i)=\Delta\epsilon(i)+kG_1(PSD_{SRS}(i)-PSD_{SRS}(i-1)) \quad \text{[Equation 5]}$$

In Equation 5, $PSD_{SRS}$ denotes a received PSD of a sounding reference signal (SRS) to be transmitted for estimating a channel state of a user terminal in a full bandwidth by an uplink for uplink resource scheduling. In general, an SRS may correspond to a channel to be transmitted by each user terminal, periodically, in order to verify a channel state of each user terminal in a full frequency band, and include a wideband SRS and a narrowband SRS. In a general LTE-based mobile communication system, the SRS may be determined based on a transmit power of a PUSCH. However, when the SRS has a frequency non-selective channel characteristic, similar to a satellite communication system, a channel quality measurement in a frequency domain using the SRS may be ineffective. Accordingly, the LTE-based satellite mobile communication system may transmit the SRS to estimate an uplink channel change. In particular, similar to the conventional LTE-based mobile communication system, an SRS signal transmission level may be determined based on a PUSCH transmit power level at predetermined intervals, and the SRS may be transmitted at an identical transmission level in the predetermined intervals. For example, when SRS signal transmission intervals correspond to {2, 5, 10, 20, 40, 80, 160, 320 ms}, an SRS may be transmitted at 5 millisecond (ms) or 10 ms intervals, and power may be updated based on a PUSCH transmit power at a corresponding instant once at 80 ms, 160 ms, and 320 ms intervals, respectively. In addition, in a case of a narrowband SRS transmission, when a transmit power of an SRS may be maintained to be constant for a time during which channel quality information relating to a full band is obtained while periodical hopping is performed, more accurate channel quality indicator (CQI) information may be obtained throughout the full band, and a trend in a channel change may be predicted, simultaneously. In Equation 5, a parameter k may have a value of k=1 when a channel prediction using the SRS is possible, and may have a value of k=0 when the SRS is unavailable.

In addition, in Equation 5, a value of $G_1$ denotes a prediction gain indicator indicating a channel change predicted value to be reflected in $\Delta\epsilon(i)$, and may have a value of $0 \leq G_1 \leq 1$. The value of $G_1$ may be determined in an upper layer.

A TPC instruction value $\Delta_p(i)$ may be determined based on the value of $\Delta\epsilon,c(i)$ determined by Equation 5, as shown in Equation 6.

If $|\Delta\epsilon,c(i)| < \epsilon_T$ and $\Delta\epsilon,c(i) < 0$, $\Delta_p(i) = 1$ dB If $|\Delta\epsilon,c(i)| < \epsilon_T$ and $\Delta\epsilon,c(i) > 0$, $\Delta_p(i) = 0$ dB If $|\Delta\epsilon,c(i)| < \epsilon_T$ and $\Delta\epsilon,c(i) < 0$, $\Delta_p(i) = 3$ dB If $|\Delta\epsilon,c(i)| > \epsilon_T$ and $\Delta\epsilon,c(i) > 0$, $\Delta_p(i) = -1$ dB  [Equation 6]

As shown in Equation 6, when a level of $\Delta_p(i)$ is set to [−1 0 3 1], a compatibility with the conventional LTE-based mobile communication system may be maintained. However, the level may be changed properly depending on a system state and a channel state. For example, when the level of $\Delta_p(i)$ is set to [−2 −1 1 2], a TPC instruction capable of better adapting to a channel change and reducing a power consumption may be transmitted.

A TPC instruction $\Delta_p(i)$ determined by Equation 6 may be transmitted to a terminal via a PDCCH. The terminal receiving the TPC instruction $\Delta_p(i)$ may determine a transmit power control value $\delta(i)$ using a TPC instruction recently received for a PUSCH transmission in an $i^{th}$ frame, as expressed by Equation 7.

$\delta(i) = \Delta_p(i) - \alpha\Delta_p(i-1)$  [Equation 7]

In Equation 7, $\alpha$ denotes a delay compensation indicator, and has a value of $0 \leq G_1 \leq 1$. The value may be determined in an upper layer.

FIG. 1 is a flowchart illustrating a power control for an uplink PUSCH transmission in an LTE-based satellite mobile communication system having a long round trip delay time as suggested above.

FIG. 2 is a detailed flowchart illustrating a power control for an uplink PUSCH transmission in an LTE-based satellite mobile communication system having a long round trip delay time as suggested above.

In contrast to an uplink, in a case of a downlink power control in an LTE-based mobile communication system, a power per sub-carrier wave may be maintained to be essentially constant with respect to a full band, and a compensation for a channel change may be performed through scheduling and link adaptation technology. Accordingly, in a case of a downlink, a TPC instruction may not be transmitted to the uplink, and CQI information for link adaptation may be fed back through the uplink. In particular, in order to perform accurate link adaptation at the downlink, accurate CQI information should be transmitted by a terminal. The terminal may determine an MCS level satisfying a target SINR, based on a received SINR of a downlink RS, and transmit the MCS level as the CQI information. However, the MCS level determined by the terminal may not correspond to a downlink channel state after a long round trip delay time elapses. Accordingly, a process of determining the MCS level and transmitting the CQI information by predicting a channel state after the round trip delay time elapses may be an essential requirement. To this end, the terminal may estimate a channel state throughout a plurality of sub-bands or a full band, for each sub-band, based on an RS for CSI to be transmitted to the downlink. In a case of an LTE-based satellite mobile communication system having a long round trip delay time, a frequent channel state estimation of a sub-frame unit may be ineffective and thus, the channel state estimation may be performed on a frame by frame basis, similar to the uplink. The channel state estimation may be performed by estimating an SINR or a PSD of an RS in a target band in which the CQI information is to be transmitted.

$\Delta_{pred}$ denotes a channel change predicted value, and $PSD_{est}$ denotes a final channel state estimated value in which $\Delta_{pred}$ is reflected.

In order to consider a long round trip delay time along with $PSD_{CSI-RS}(i)$ and the estimated PSD value of the RS signal for CSI in the $i^{th}$ frame, $PSD_{est}$ may be obtained by reflecting a PSD value in an $(i-1)^{th}$ frame and a change trend $\Delta_{pred}$ of $PSD_{CSI-RS}(i)$, as expressed by Equation 8.

$PSD_{est} = PSD_{CSI-RS}(i) + \Delta_{pred} = PSD_{CSI-RS}(i) + G_2(PSD_{CSI-RS}(i) - PSD_{CSI-RS}(i-1))$  [Equation 8]

In Equation 8, $G_2$ denotes a prediction gain indicator indicating a channel change predicted value to be reflected in $PSD_{est}$, and may have a value of $0 \leq G_2 \leq 1$. The value may be determined in an upper layer. A proper MCS level may be determined by comparing the calculated $PSD_{est}$ value to a PSD or SINR value requested at each MCS level. Here, in a case of an LTE-based mobile communication system having a frequency non-selective channel characteristic, similar to a satellite communication system, a change in a channel may be absent in a frequency area. Accordingly, when a physical broadcast channel (PBCH) to be transmitted at all times at the downlink is considered along with a PSD or SINR value of a synchronization channel (SCH), a more precise channel prediction may be possible due to a diversity gain. $PSD_{est}$ for a case in which the PBCH and the SCH are available may be expressed by Equation 9.

$PSD_{est} = PSD_{CSI-RS}(i) + \Delta_{pred} = PSD_{CSI-RS}(i) + G_2(PSD_{CSI-RS+PBCH+SCH}(i) - PSD_{CSI-RS+PBCH+SCH}(i-1))$  [Equation 9]

FIG. 3 is a flowchart illustrating a downlink link adaptation considering a long round trip delay time as suggested.

FIG. 4 is a detailed flowchart illustrating a downlink link adaptation method considering a long round trip delay time as suggested.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A power control method for uplink data channel transmission in a satellite mobile communication system, the method comprising:
   (a) determining a channel estimation value using a power spectral density (PSD) value of a frame unit, by a base station; and
   (b) generating a transmit power control (TPC) instruction based on the channel estimation value and a round trip delay time, and transmitting the generated TPC instruction to a terminal, by the base station,
   wherein,
   a transmit power control value at the terminal is determined based on the TPC instruction transmitted to the terminal and a delay compensation indicator.

2. The method of claim 1, wherein the satellite mobile communication system is configured based on a long term evolution (LTE) network, the data channel corresponds to a physical uplink shared channel (PUSCH), and the transmit power control value is measured using the TPC instruction.

3. The method of claim 2, wherein the PSD value of the frame unit corresponds to an average value of PSD estimation values in a sub-frame for a PUSCH transmitted in a frame.

4. The method of claim 2, wherein the TPC instruction is determined by reflecting a difference predicted value corresponding to a difference between a received PSD value and a target PSD value after the round trip delay time determined by the following Equation elapses, $$\Delta\epsilon, c(i) = \Delta\epsilon(i) + kG_1(PSD_{SRS}(i) - PSD_{SRS}(i-1)),$$  Equation:

wherein, $\Delta\epsilon, c(i)$ denotes a difference predicted value corresponding to a difference between a received PSD value and a target PSD value after the round trip delay time elapses, $\Delta\epsilon(i)$ denotes a difference between an estimated $PSD_{est}(i)$ and a $PSD_{target}$ for supporting a given modulation and coding scheme (MCS) level, a parameter k has a value of k=1 when channel prediction through a Sounding Reference Signal (SRS) is possible, or a value of k=0 when the SRS is unavailable, $G_1$ denotes a prediction gain indicator indicating a channel change predicted value to be reflected in $\Delta\epsilon(i)$, and has a value of $0 \leq G_1 \leq 1$, and $PSD_{SRS}$ denotes a received PSD of an SRS signal.

5. The method of claim 1, wherein the transmit power control value is determined by the following Equation, $$\delta(i) = \Delta_p(i) - \alpha \Delta_p(i-1),$$  Equation:

wherein, $\delta(i)$ denotes a transmit power control value, α denotes a delay compensation indicator, and has a value of $0 \leq G_1 \leq 1$, p(i) denotes a current TPC instruction, and p(i−1) denotes a past TPC instruction.

6. A downlink power control method in a satellite mobile communication system, the method comprising:
   estimating a channel state of a target band on a frame basis, by a terminal;
   determining a channel change predicted value based on a round trip delay time, by the terminal;
   determining a final channel state estimated value, using a channel change predicted value after the round trip delay time elapses, by the terminal;
   determining a modulation and coding scheme (MCS) level, by comparing the final channel estimated value to a power spectral density (PSD) value required at each MSC level or a signal to interference and noise ratio (SINR) value, by the terminal; and
   transmitting channel quality indicator (CQI) information comprising the MCS level to a base station, by the terminal.

7. The method of claim 6, wherein the target band corresponds to a sub-band, a plurality of sub-bands, or a full band, based on a reference signal (RS) for channel state information (CIS) to be transmitted to a downlink.

8. The method of claim 6, wherein, when a channel state of the target band is to be estimated on a frame by frame basis, the estimating comprises estimating the channel state by estimating an SINR value or a PSD value of an RS in the target band.

9. The method of claim 6, wherein the channel change predicted value is determined by the following Equation, $$\Delta_{pred}=G_2(\text{PSD}_{CSI\text{-}RS}(i)-\text{PSD}_{CSI\text{-}RS}(i-1)),$$ Equation:

wherein, $G_2$ denotes a prediction gain indicator indicating a channel change predicted value to be reflected in $\text{PSD}_{est}$, and has a value of $0 \leq G_2 \leq 1$, and $\text{PSD}_{CSI\text{-}RS}(i)$ denotes a PSD value of an RS for CSI in an estimated $i^{th}$ frame.

10. The method of claim 6, wherein the final channel state estimated value is determined by the following Equation, $$\text{PSD}_{est}=\text{PSD}_{CSI\text{-}RS}(i)+\Delta_{pred}=\text{PSD}_{CSI\text{-}RS}(i)+G_2(\text{PSD}_{CSI\text{-}RS}(i)-\text{PSD}_{CSI\text{-}RS}(i-1))$$ Equation:

11. The method of claim 6, wherein the final channel state estimated value is determined by the following Equation determined using a physical broadcast channel (PBCH) and a synchronization channel (SCH), $$\text{PSD}_{est}=\text{PSD}_{CSI\text{-}RS}(i)+\Delta_{pred}=\text{PSD}_{CSI\text{-}RS}(i)+G_2(\text{PSD}_{CSI\text{-}RS+PBCH+SCH}(i)-\text{PSD}_{CSI\text{-}RS+PBCH+SCH}(i-1))$$ Equation:

wherein, $\text{PSD}_{CSI\text{-}RS+PBCH+SCH}(i)$ denotes a value obtained by reflecting a PSD of the PBCH and a PSD of the SCH in a PSD value of an RS for CSI in an estimated $i^{th}$ frame.

* * * * *